United States Patent [19]

Mashida et al.

[11] 4,447,473

[45] May 8, 1984

[54] METHOD OF PRODUCING DECORATIVE OBJECTS

[76] Inventors: Toru Mashida, 26-16, Miyamae 5-chome; Sumeo Matsushita, 47-17, Izumi 3-chome, both of Suginami-ku, Tokyo, Japan

[21] Appl. No.: 437,532

[22] Filed: Oct. 29, 1982

[30] Foreign Application Priority Data

Nov. 6, 1981 [JP] Japan .................................. 56-177112

[51] Int. Cl.³ ............................................. B05D 5/02
[52] U.S. Cl. .................................... 427/162; 427/203; 427/250; 427/262; 427/264; 427/383.9; 427/405; 428/155; 428/204
[58] Field of Search ............... 427/162, 199, 203, 250, 427/257, 262, 383.5, 383.9, 405, 264; 428/155, 204

[56] References Cited

U.S. PATENT DOCUMENTS

| | | | |
|---|---|---|---|
| 2,210,556 | 8/1940 | Rosenberg | 427/257 |
| 3,060,610 | 10/1962 | Stangl | 427/262 |
| 3,944,440 | 3/1976 | Franz | 427/162 X |

FOREIGN PATENT DOCUMENTS

| | | | |
|---|---|---|---|
| 1621412 | 10/1972 | Fed. Rep. of Germany | 427/262 |
| 25705 | of 1899 | United Kingdom | 427/257 |

*Primary Examiner*—Shrive P. Beck
*Attorney, Agent, or Firm*—McAulay, Fields, Fisher, Goldstein & Nissen

[57] ABSTRACT

The decorative objects on which a light-interference surface layer showing an esthetic design is formed is produced by the steps of forming a metal thin film on glazed and baked surface of a base body and treating the base body at high temperature in oxygen atmosphere, and which are highly useful as decorative articles, dinner sets, building materials, and industrial art objects.

4 Claims, 1 Drawing Figure

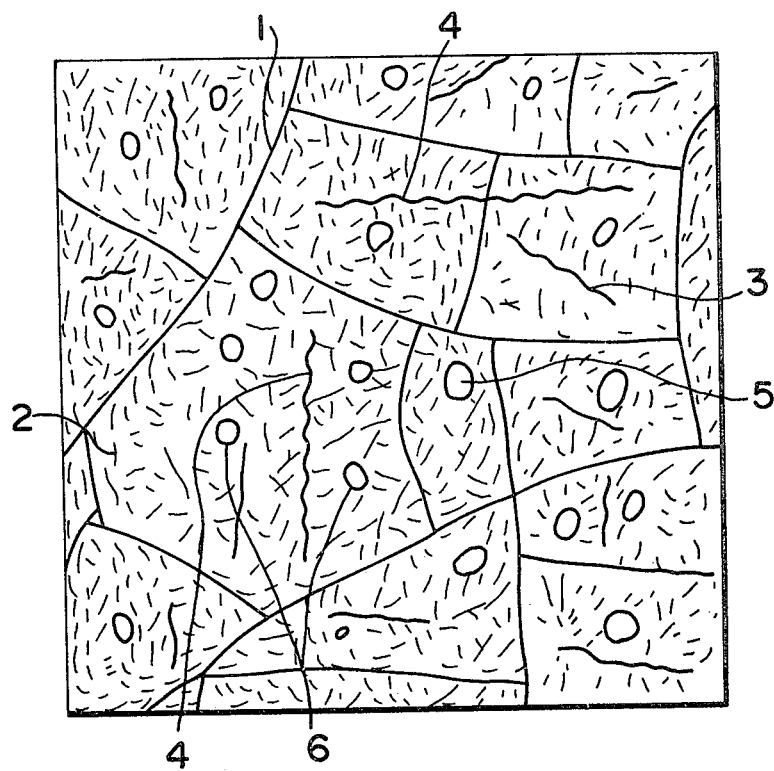

METHOD OF PRODUCING DECORATIVE OBJECTS

BACKGROUND OF THE INVENTION

This invention relates to a method of producing a decorative object having a novel patterned surface.

Light interference colors shown by transparent dielectric thin film have attractive attention of many people since early times, and mother-of-pearls using shells, decorative inlayed objects using natural materials such as pearls, fish scales, etc. have been manufactured willingly. However, with the recent development in the technique of manufacture of thin films, a large number of decorative objects utilizing the light interference colors of artificially produced transparent dielectric thin films are to be seen abundantly. These decorative objects are produced by depositing transparent dielectric substance as a film on a glass, metal plate, metal foil having an appropriate thickness by means of vacuum deposition, sputtering, ion plating, chemical vapor deposition (vapor phase glowing), or the like, so as to present a light interference color. With such methods, however, it is not always easy to produce such a transparent dielectric film, but requires high and precise techniques, and much of time is required as compared with the case of producing metal films.

In this invention, the object of which is to produce decorative object utilizing light interference the same as in the prior art, but is intended to develop light interference pattern layers which are more deeper and complicated, without requiring high precision techniques and yet easily and in short times.

SUMMARY OF THE INVENTION

Accordingly, the object of the present invention is to provide a method of producing decorative objects, which is characterized by comprising the steps of forming a metal thin film on glazed and baked surface of a base body and treating the base body at high temperature in oxygen atmosphere, whereby a light-interference surface layer showing an esthitic pattern is formed.

As for the base body used in this invention, metals such as copper, silver, gold, iron, steel, stainless steel and other alloys, heat-resisting materials such as ceramics, china and porcelain, etc. can be mentioned.

As for the glaze, there are glaze for china and porcelain, and glaze for metals (enamel, cloisonné glaze), and a suitable glaze is selected appropriately in compliance with the material of the base body used. The glaze may be any of colorless, colored, or opaque. Glazing on the base body may be carried out according to any of conventional methods.

After the base body has been glazed and baked, a metal thin film is formed on the glazed and baked surface, and it is effected by any of vacuum deposition, sputtering, ion plating, chemical vapor deposition, and plating methods. Here, the chemical vapor deposition (CVD) means a method producing thin films utilizing chemical reaction as against physical vapor deposition (PVD) such as vacuum deposition method, sputtering, ion plating method, and is intended to include methods for producing thin films by interposing chemical reaction in the process of the sputtering or ion plating.

A variety of materials for metal thin film to be produced are used such as Fe, Cr, Ni, Cu, Zn, Ti, Mn, Al, Mg, Zr, Si, Pb, Sn, In, Sb, Co, Mo, W, Bi, steel and alloy. However, metals which are easily oxidized in oxygen atmosphere at high temperature are preferable.

The thickness of the metal thin film varies in some degree according to the properties of the material, but it is preferable to select a thickness which develops a light interference on the surface upon oxidation, for example, 30 millimicrons or more.

The glazed base body having the metal thin film thereon thus prepared is treated at high temperature in oxygen atmosphere. When the high-temperature treatment is effected in an electric furnace, it is not necessary to introduce oxygen thereto, but can be performed in air. In the case of a ceramic kiln, an oxidizing flame kiln is used. For the high temperature treatment, methods of heating such as burner heating in air, infrared heating, induction or dielectric heating are employed besides treatments in furnace and kiln. Temperature in the high temperature treatment may be such an order that the metal thin film is oxidized and the glaze is become a semi-fluid state, and the temperature may be sufficient for most of cases within a range covering from 300° to 1500° C., although it varies more or less according to the kinds of metal film or glaze used.

Being treated at high temperature, the metal film is rapidly oxidized from the surface to form an oxidized film, and develops light interference color. As the oxidation proceeds, the interference color also varies. This phenomenon is considered to be occurred according to a known relation between the optical film thickness and the light interference color regarding the transparent dielectric film. During the intermediate stage of heat treatment, the upper layer is a metal oxide film, and the lower layer is in a state of metal thin film. The high temperature treatment may be stopped at this stage or proceeded till the metal thin film is entirely oxidized, and sometimes may be effected mixture as above, that is, some part of metal film is entirely oxidized and other part is oxidized only the upper layer.

In a word, the degree of oxidation of the metal film is appropriately controlled in accordance with the desired pattern or design.

The object of the high-temperature heat treatment is not only to form a thin film of a transparent metal oxide showing light interference color by oxidizing the metal film as described above, but to give a complicated change in pattern by producing cracks, creases, streaks, foams, etc. on the metal layer or metal oxide layer.

The metal film is hardly dissolved into glaze in semi-fluid state at high temperature, but the metal oxide layer is easily dissolved into glaze and the interference color is lost.

Accordingly, due to the temperature condition of the high-temperature heat treatment, temperature unevenness, thickness of the thin film, unevenness of film thickness, or degree of oxidation (heat treating time), and due to the complicated interaction of these items, complicated cracks, creases, streaks or the like are produced on the metal oxide layer and the metal layer on the surface of the base body. In addition, the metal oxide layer disappears being dissolved into the glaze, presenting thereon a natural texture of glaze, or mat texture by rugged surface caused by foams or bumpings. Thus, complicated, deep and tasteful light interference patterns are obtained which are different from the simple interference patterns of conventional transparent dielectric film.

Furthermore, the metal thin film can be combined strongly with the glaze, which makes it possible to withstand against friction or abrasion.

The high-temperature treating time can be set at a point where a desired pattern is appeared considering the complicated interaction as described above.

In this invention, a variety of colored glazes having different characteristics are used appropriately to the above-described base body to form a glazed surface, and forming a metal thin film on the glazed and baked surface by means described above, then treating at high temperature in oxygen atmosphere whereby to form a surface layer having a light interference characteristic which shows a beautiful pattern.

As for the glaze, there are glaze for china and porcelain, and glaze for metals (enamel, cloisonneé glaze), and suitable glazes having different characteristic (for example, melting point, specific heat, fluidity, etc.) are selected appropriately in compliance with the material of the base body, and using a glaze having a different colors from among them to form a glazed surface having suitable colored design on the base body. By forming an interference film on the glazed surface by the process described above, each of the color glazed surfaces shows not only different light interference colors respectively, but also particular light interference color are developed on respective surfaces produced by overlapping of reflected light from the colored glaze on the ground and interference light from the light interference film on the upper layer. As a result, unique interference color are produced on respective surfaces, whereby it is possible to obtain a colored surface of light interference having a tasteful and beautiful interference pattern as a whole. At the stage of formation of a metal oxide film on a glazed surface using glazes having different characteristics (such as melting point, specific heat, fluidity, chemical composition, etc.) by oxidizing the metal thin film at a high temperature (e.g. 700° C.), it has been found that the time required until the light interference color appears, and the rate of change of light interference color, that is, oxidization rate are different in dependence on their characteristics of glazes. The reason thereof is assumed to be due to the facts that the oxidation prcoess of the metal film is effected by various factors such as the heat capacity at the high temperature, heat conductivity, melting point, fluidity at the high temperature, melting of metals or metal oxides into the glaze, chemical reaction, chemical composition, etc. As the result of phenomenon as found above, by developing the light interference color on the glazed surface with various colored glaze by the above-said method, a variety of interference colors are shown on respective color-glazed surfaces, and these interference colors are superposed with the reflection light from the color glaze on the ground, thus, a tasteful, complicated light interference color pattern is obtained.

According to this method, an epoch-making decorative article having deep and complicated light interference pattern layer can be obtained. In the light interference pattern, the interference colors appear particularly strong, or weak, according to the angle (direction) of viewing with respect to the film surface.

In this invention, it is possible to produce a uniform interference color as viewed from any angle by further providing roughness or ruggedness on the glazed surface.

More particularly, glaze is applied on the base body in fine rugged fashion, baking it to form a fine rugged glazed surface, then forming metal thin film thereon, and treating it at high temperature in oxygen atmosphere, whereby a surface layer having light interference characteristic presenting esthetic design or pattern wherein a uniform light interference color is seen from any angle can be obtained.

As for the base body used in this invention, metals such as copper, silver, gold, iron, steel, stainless steel and other alloys, heat-resisting materials such as ceramics, china and porcelain, etc. can be mentioned. As for the glaze, there are glaze for china and porcelain, and glaze for metals (enamel, cloisonné glaze), and a suitable glaze is selected appropriately in compliance with the material of the base body used. The glaze may be any of colorless, colored, or opaque. Such an application of glaze in fine rugged form is effected by, for instance, merely sprinkling properly glaze powder on the base body. By this means, a fine rugged form is presented on the glazed surface after baking, such as island-shaped, citron-skinned or crape shaped. In compliance with the loose or dense sprinkling of glaze powder on the base body, or by adjusting the quantity of sprinkling, the roughness of projections on the glaze surface after baking can be changed whereby above-said citron-skinned, crape-shaped pattern can be produced wherein glaze is developed in island-shapes and base surfaces are shown where no glaze have been applied.

As for another means, fine rough surfaces are formed by sprinkling heat-resisting fine particles on the glazed, or glazed and baked base surface, baking it, and further forming a metal thin layer theron, then treating it at high temperature in oxygen atmosphere so as to form a light interference surface layer which presents uniform light interference color showing esthetic design when viewed from any angle.

This procedure can be effected by sprinkling heat-resisting fine powder on the glazed and baked base surface and baking again, or sprinkling heat-resisting fine powder after glaze has been applied on the base body and baking it, to form a glazed surface of rugged design or pattern. As for the heat-resisting fine powder, fine bead powder of inorganic material such as glass beads, metal beads, and broken fregments of glass, ceramics, metal, gem, or the like are used. It is necessary that these fine powders have a heat resistance of a degree soluble not throughly at the baking stage.

Through the methods as mentioned above, rugged or rough surface is formed on the glazed surface, and the interference light due to the metal thin film formed on the surface is reflected uniformly throughout wide angles, whereby a colored surface of light interference having a tasteful, beautiful interference design or pattern can be obtained as a whole.

The light interference surface layer formed by the above-mentioned method can be protected against friction and/or abrasion by covering it with a transparent plastic, transparent coating material, or the like.

BRIEF DESCRIPTION OF THE DRAWING

A single drawing shows an enlarged microscopic view useful for easy explanation of a state of pattern. The metal oxide layer and metal layer in the metal thin film formed on the glazed surface are, when viewed by a microscope, developed irregular cracks including thick cracks 1 and thin cracks 2, creases 3, streaks 4, foam holes 5, and deposit of underground glazes caused by bumpings 6. This is presumably caused relative to sudden volume change when the glaze reaches transition point of glass and the mechanical strength of thin film.

DETAILED DESCRIPTION OF THE INVENTION

The present invention will now be described referring to the embodiments.

EXAMPLE 1

Applying white cloisonné glaze on a cleansed copper plate to prepare a white cloisonné plate by baking it in a furnace at 850° C. for 5 minutes. Placing the plate in a sputtering device with an iron plate as the target, and formed a thin iron film about 0.6 micron thick on the white cloisonné plate by DC discharge. Upon putting it into an electric furnace (air atmosphere) at 800° C., the metal film was immediately oxidized and showed a golden interference color. The color changed from pink to blue interference color after 20 seconds, and successively changes its interference color with the lapse of time, and after about 2 minutes, it presented partly different interference color: a part of the thin film dissolving into the glaze and lost its interference color to show white color of the glaze, and the film with interference color produces long or small cracks, and further, creased or foamed to form a cloisonné plate having a light interference pattern of mat texture with variety of taste.

EXAMPLE 2

Preparing glazed porcelain dish by applying low-temperature glaze (melting point 550° C.) on a porcelain dish, baking it at 850° C. for 5 minutes, and putting it into a sputtering device having chromium metal plate as the target, and formed a chromium film about 0.5 millimicrons thick on the surface of said porcelain dish. Placing it in an electric furnace at 700° C. and heated it for 5 minutes, whereby a porcelain dish having a light interference color pattern of a mat mode with large and small cracks was obtained. In this case, in addition to the chromium oxide layer which shows finely cracked interference color, minutely cracked metallic chromium layer, although this layer does not show an interference color, is produced partly, thus a porcelain dish having interference color with a particular taste was obtained.

EXAMPLE 3

A pattern was drawn on a heat-resisting ceramic plate using blue, green, yellow, red and white color glazes by means conventionally known heretofore. The baking temperature of these color glazes are 750° to 850° C. The article is placed in an electric furnace and baked at 900° C. for 5 minutes. Placing the article in a sputtering device with a titanium metal as the target, subjecting it to a DC discharge in a low-pressure argon stream for 50 seconds to produce a metal titanium thin film on the ceramic plate having a variety of color glazed surface. Placing the plate in an electric furnace (air bath) at 750° C. to obtain a ceramic plate having a light interference film. In the light interference color seen from said light interference film, original interference color due to the thickness of the light interference film is superposed with the reflecting color from the color glaze of the underground, and particular interference colors are developed on individual glazed surfaces having blue, green, yellow, red, and white, respectively, thus a ceramic plate having complicated and tasteful light interference color design or pattern as a whole was obtained.

Furthermore, by placing circular, star-shaped or annular shaped masks on the glazed surface at the sputtering operation, so as to give patterns on the metal thin film formed on the glazed surface, whereby an esthetic design is obtained on the light interference pattern formed as described above.

EXAMPLE 4

Glaze powder having a baking temperature of 850° C. is loosely sprinkled on a heat-resisting ceramic plate using a sieve. Placing the plate in a furnace at 870° C. for 3 min. to obtain a glazed ceramic plate with a surface having a crape-shaped pattern. Placing it into a sputtering device with titanium metal as the target, and then subjecting it to a DC discharge in a low-pressure argon stream for 50 seconds to obtain a metal titanium thin film on the ceramic plate having a glazed surface. Placing it in an electric furnace (air bath) at 700° C. to form an oxide film, whereby a ceramic plate presenting a golden interference color is obtained. In this plate, golden light interference color is seen from the crape-patterned rough surface. In this case, variation in intensity of light interference color according to the viewing direction is extremely small, thus a ceramic plate having light interference surface layer of beautiful golden crape pattern was obtained.

EXAMPLE 5

A glaze having a baking temperature of 850° C. is applied on a heat-resisting ceramic plate and baked, and sprinkled with glass beads of 0.2 to 0.8 mm in diameter, and baked again and formed a finely roughened surface. A titanium oxide film was formed thereon and oxidized by the method the same as Example 4. The plate has a citron-like surface having a fine roughness, and a blue interference color is seen from the surface, but the intensity of interference color according to the viewing direction is extremely small. Thus a ceramic plate having a light interference surface layer with beautiful blue citron-like pattern was obtained.

EXAMPLE 6

Applying the same color glaze as that of the Example 3 on a heat-resisting ceramic plate, sprinkling glass beads of 0.2 to 0.8 mm in diameter thereon, and baking it to form a finely roughened surface thereon. An oxide film of titanium was formed on the ceramic plate having a glazed surface by a method the same as that in Example 3. The plate had a citron-like, finely roughened surface, and a complicated interference color of colored glaze on the underground was seen from the surface. The variation in intensity of the interference color according to viewing direction was extremely small, thus a ceramic plate having a light interference surface layer with citron-like pattern of beautiful and complicated tone of color was obtained.

As described above, according to the present invention, decorative objects having novel design surfaces can be obtained, and which are highly useful as decorative articles, dinner sets, building material, and industrial art objects.

We claim:

1. A method of producing decorative objects comprising the steps of forming a metal thin film on glazed and baked surface of a base body and treating the base body at high temperature in oxygen atmosphere, wherein the high temperature treatment causes oxidation of the thin film applied directly to the glazed and baked surface and the glazed and baked surface comes to a semi-fluid state to provide a surface with a form of fine ruggedness or unevenness, whereby a light-interference surface layer showing an esthetic pattern is formed.

2. The method of producing decorative objects as claimed in claim 1, wherein the base body is glazed appropriately using variety of color glazes having different characteristics.

3. The method of producing decorative objects as claimed in claim 1 which comprises the steps of forming fine ruggedness or unevenness on the surface of a glazed base body or a glazed and baked base body by sprinkling heat-resisting fine powder and baking, then forming a metal film thereon, and treating the metal thin film applied directly to said base body at high temperature in an oxygen atmosphere, whereby a light-interference surface layer showing an esthetic pattern is formed.

4. The method of producing decorative objects as claimed in claim 1, wherein the formation of the metal thin film is carried out by any of vacuum deposition, sputtering, ion plating, chemical vapour deposition and plating methods.

* * * * *